United States Patent [19]
Adcock et al.

[11] Patent Number: 6,040,075
[45] Date of Patent: Mar. 21, 2000

[54] ELECTROLYTIC AND FUEL CELL ARRANGEMENTS

[75] Inventors: Paul Leonard Adcock; Philip John Mitchell, both of Leicestershire; Simon Edward Foster, Lancashire, all of United Kingdom

[73] Assignee: Loughborough University of Technology, Leicestershire, United Kingdom

[21] Appl. No.: 08/849,507

[22] PCT Filed: Dec. 15, 1995

[86] PCT No.: PCT/GB95/02937

§ 371 Date: Jul. 31, 1997

§ 102(e) Date: Jul. 31, 1997

[87] PCT Pub. No.: WO96/19015

PCT Pub. Date: Jun. 20, 1996

[30] Foreign Application Priority Data

Dec. 17, 1994 [GB] United Kingdom .................... 9425622
Dec. 17, 1994 [GB] United Kingdom .................... 9425623

[51] Int. Cl.[7] ............................. H01M 8/10; H01M 8/24; H01M 12/06
[52] U.S. Cl. .................................. 429/32; 429/27; 429/35; 429/39; 429/40; 429/162; 429/210
[58] Field of Search ................................ 429/32, 35, 38, 429/39, 40, 162, 210, 27

[56] References Cited

U.S. PATENT DOCUMENTS

| | | |
|---|---|---|
| 3,167,456 | 1/1965 | Schilke et al. . |
| 3,230,115 | 1/1966 | Tamminen . |
| 3,920,477 | 11/1975 | Alaburda . |
| 4,551,399 | 11/1985 | Despic ........................................ 429/27 |
| 4,769,296 | 9/1988 | Sterzel .................................... 429/32 X |
| 5,171,646 | 12/1992 | Rohr ....................................... 429/32 X |
| 5,364,711 | 11/1994 | Yadada et al. . |
| 5,405,712 | 4/1995 | Yoshimura et al. ....................... 429/38 |
| 5,567,543 | 10/1996 | Constable ............................ 429/162 X |

FOREIGN PATENT DOCUMENTS

| | | |
|---|---|---|
| 269047 | 6/1988 | European Pat. Off. . |
| 1452564 | 8/1966 | France . |
| 1917946 | 11/1969 | Germany . |
| 4329819 | 2/1995 | Germany . |
| 60-000069 | 1/1985 | Japan . |
| 61-121265 | 6/1986 | Japan . |
| 3-116661 | 5/1991 | Japan . |
| 4-206162 | 7/1992 | Japan . |
| 5-041221 | 2/1993 | Japan . |
| WO 93/11574 | 6/1993 | WIPO . |
| WO 94/05051 | 3/1994 | WIPO . |

*Primary Examiner*—Stephen Kalafut
*Attorney, Agent, or Firm*—James E. Bradley

[57] ABSTRACT

There is disclosed an electrolytic or fuel cell arrangement comprising a stacking of bipolar elements (21, 31, 41), each element comprising an anode part (22) and a cathode part (23), the anode part of one element cooperating with the cathode part of the next adjacent element.

56 Claims, 10 Drawing Sheets

ELECTROLYTIC AND FUEL CELL ARRANGEMENTS

This invention relates to galvanic and electrolytic cell arrangements such for example as fuel cells, dry cell batteries, rechargeable batteries and redox flow cells.

In fuel cells, a fuel such as hydrogen is reacted with an oxidant (oxygen or air) under conditions such that an electric potential is generated, for example by feeding the hydrogen and oxygen to opposite faces of a proton conducting or ion exchange membrane. The faces of the membrane may be made conductive as by coating with carbon or platinum which also acts as a catalyst.

While fuel cells have been developed for some decades, they have essentially been regarded as special purpose devices.

Battery arrangements are manufactured in a wide range of formats and, for voltages higher than that (usually around 1 volt) of a single cell, comprise series assemblies or stackings of individual cells. Usually, different types of battery have quite different formats. Where rechargeables are designed to substitute for conventional dry cell e.g. torch batteries, they will have the same outward form, but the internal components will be different.

It is noted in passing that some batteries normally regarded as non-rechargeable may, with care, be recharged.

The present invention provides fuel cell and electrolytic cell arrangements that lend themselves to mass production, flexibility of design using, however, standard parts, with limitless choice of voltage and current capacities, indeterminate lifetime and compactness for any given power output.

In a first aspect of the invention there is provided an electrolytic or fuel cell arrangement comprising a stacking of bipolar elements, each element comprising an anode part and a cathode part, the anode part of one element cooperating with the cathode part of the next adjacent element.

Each element may comprise an anode plate and a cathode plate joined by a step.

The elements may be monolithic, and may be moulded elements. Otherwise, the elements may be assembled from an anode plate part, a cathode plate part and a step part bridging the anode and cathode plate parts. In an electrolytic cell arrangement the assembly may be effected by deposition of layers on a substrate.

In an electrolytic cell arrangement the anode part and cathode part may confine between them an electrolytically active material.

An electrolytic cell arrangement may comprise conventional dry cells in which the anode and/or cathode and/or electrolyte material is/are consumable. The cells, however, may equally well be conventional rechargeable cells such as lead-acid, nickel-cadmium or nickel-metal hydride cells. The cells may be metal-air cells such as zinc-air, aluminium-air or iron-air cells, in which the cathode part is air-breathing, as by a perforate, such as a grating, construction.

The cells may be redox flow cells - the stacked elements in this case may require to be electrically insulated from each other, anode-to-anode and cathode-to-cathode. Adjacent anodes may be insulated from each other by ducting for the electrolyte, as may adjacent cathodes.

The elements may be made from an electrolyte-resistant material, and may be comprised in graphitic or other carbon material or in plastics material, which may be rendered electrically conductive by including a filler such as carbon or an electrically conductive insert such as a metal plate or gauze.

The elements may, however, be comprised in a metal material such as an oxide-coated titanium foil or plate. Nickel plating or nitriding could also be used as protective coatings.

In a fuel cell arrangement the elements may have working fluid supply and exhaust ducting. The anode part and the cathode part of each element may have working fluid supply and exhaust ducting or, in the case where the oxidant is ambient air, the anode part alone may have supply and exhaust ducting while the cathode part has an ambient air access arrangement, the cathode part may then have a grating structure.

In a fuel cell arrangement a proton conducting or ion exchange membrane may be held between the anode part of one element and the cooperating cathode part of the next adjacent element.

The elements may be stacked in or on a holder comprising a working fluid supply and exhaust manifold arrangement.

The elements may be conductive and may be made of graphitic or other carbon material or of polymeric material with low permeability to oxygen and hydrogen. Said polymeric material may include graphite or carbon black.

The elements may include a metallic plate or gauze.

The arrangement—electrolytic or fuel cell—may be one in which the elements are stacked in line or in a two dimensional array or even, using special elevating elements, a three dimensional array.

In a second aspect of the invention there is provided a fuel cell comprising:
  a base comprising fuel ducting;
  a membrane electrode assembly having an anode and a cathode on opposite faces of a fuel cell membrane;
  an anode current collector and a cathode current collector in contact respectively with the anode and cathode and being of thin metal perforated for fuel and reagent access to the membrane;
  the base being edge-sealingly bonded to the membrane.

The collectors may be etch perforated.

The collectors may be of thin stainless steel sheet.

The total thickness (base, membrane and collectors) may be between 2 and 5 mm.

The fuel cell may comprise a plurality of membrane electrodes spaced along a base strip and a corresponding plurality of anode and cathode current collectors of which at least one anode and one cathode current collector are integral, connected on a fold line and folded so that the anode current collector is on one face and the cathode current collector is on the opposite face of the membrane electrode.

Embodiments of electrolytic cell and fuel cell arrangements according to the invention will now be described with reference to the accompanying drawings, in which.

Figure 1:
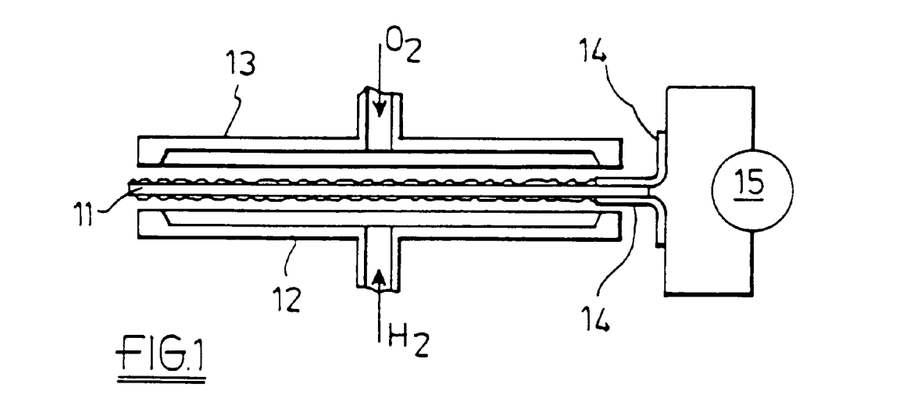
FIG. 1 is a diagrammatic illustration of the principle of operation of a fuel cell of the kind particularly used in the embodiments illustrated in FIGS. 2 to 11.

FIG. 1 illustrates the principle of operation of the fuel cell arrangements illustrated more specifically in FIGS. 2 to 11. A proton conducting or ion exchange membrane 11 (such as that sold by Dupont as Nafion RTM) which is coated with an electrically conductive catalyst such as platinum or platinum on carbon, is held between an anode plate 12 and a cathode plate 13 to which hydrogen and oxygen are supplied as shown. Electrodes 14 attached to the opposite faces of the membrane 11 are at different electrical potentials as the hydrogen nuclei cross the membrane to react with oxygen molecules and can be connected to a load 15.

Figure 2:
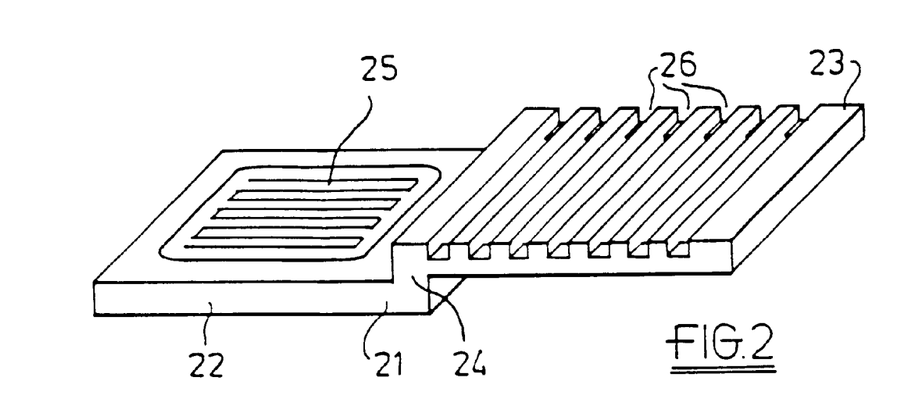
FIG. 2 is a perspective view of one element of an air-breathing fuel cell arrangement.
Figure 3:
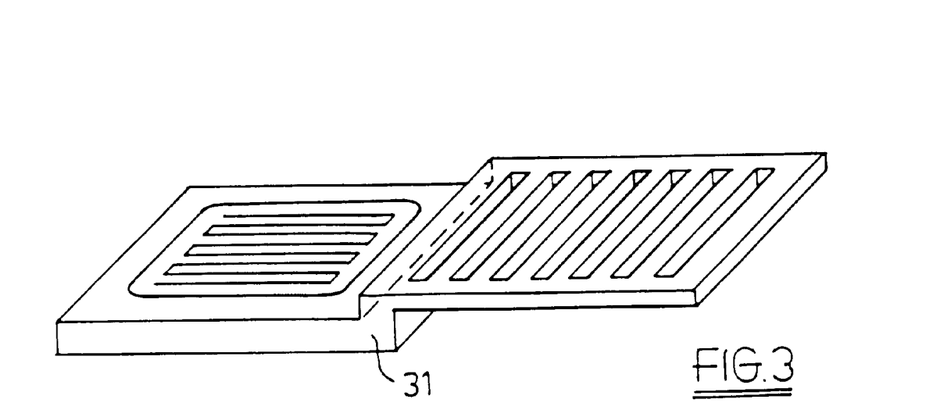
FIG. 3 is a perspective view of an element of an oxygen-fed fuel cell arrangement.
Figure 4:
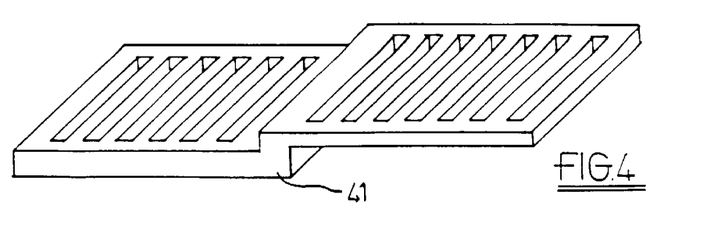
FIG. 4 is a perspective view of a variant of the element of FIG. 3.

The fuel cell arrangements of the invention comprise stackings of bipolar elements 21, 31, 41 such as those illustrated in FIGS. 2, 3 and 4.

FIG. 2 illustrates one form of air breathing arrangement, the element 21 comprising an anode part 22 and a cathode part 23. The anode part 22 is a square plate, the cathode part 23 a like square plate joined to the anode part 22 by a step 24. The anode plate 22 has recessing 25 affording access to a membrane which overlies it—see subsequent Figures—of the fuel gas hydrogen. The cathode plate 23 also has recessing 26 in the form of a grating with side openings for ambient air access when the top is closed off. The elements 31, 41 in FIG. 3 and 4 are basically similar to the element 21 but with different recessings, not open to the side so they can be sealed to fuel/oxidant supplies.

Figure 5:
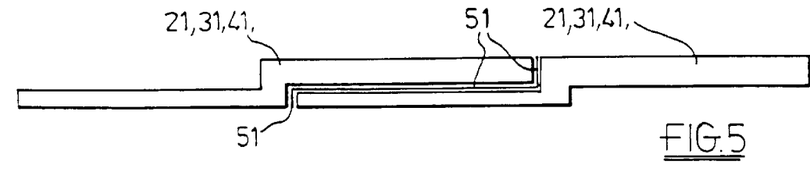
FIG. 5 is a side elevation of two elements when stacked with a membrane-electrode assembly.

FIG. 5 illustrates how the elements 21, 31 or 41 stack together with the membrane-electrode assembly 51. Clearly, any desired number of elements can be so stacked, their electrodes being connected in series or parallel according to the required voltage output.

Figure 6:
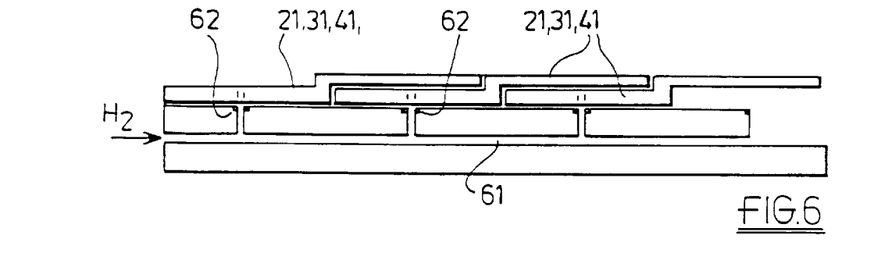
FIG. 6 is a side-elevation of an air-breathing assembly showing elements in line and a working fluid supply manifold.
Figure 7:
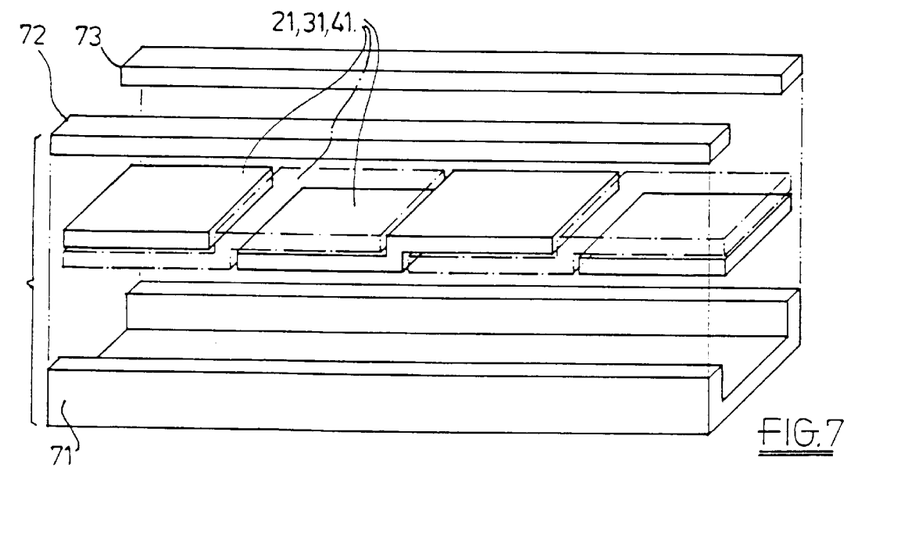
FIG. 7 is an exploded perspective view showing elements stacked in a supply manifold arrangement.
Figure 8:
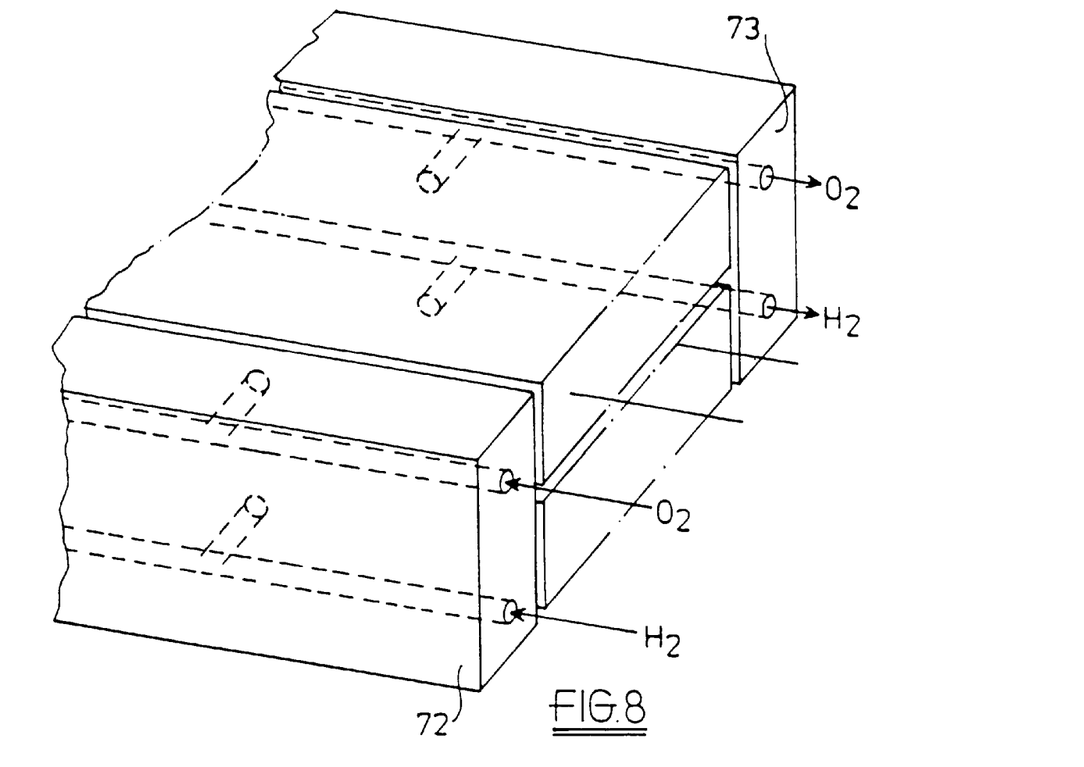
FIG. 8 is a part cut-away view showing fuel/oxidant manifolding and ducting arrangements.

FIG. 6 illustrates how hydrogen fuel is supplied to the anode plates 21, 31 or 41 by a manifold arrangement 61, with O-ring seals 62. This is all the manifolding that is required for an air-breathing arrangement. For an oxygen-fed arrangement an assembly of elements 21, 31 or 41 can be stacked in a support 71—FIG. 7—with laterally extending hydrogen and oxygen supply and exhaust manifolds 72, 73—see also FIG. 8.

Figure 9:
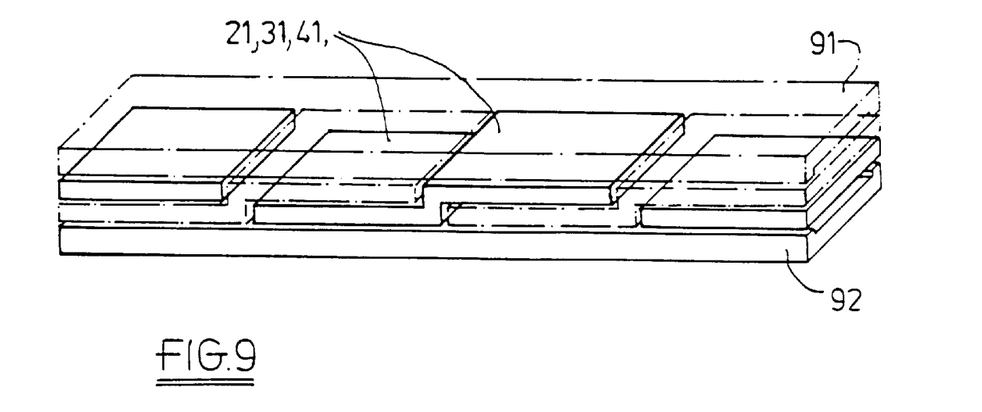
FIG. 9 is a "transparent" perspective view showing another fuel/ oxidant supply arrangement.

FIG. 9 show another manifold arrangement in which the stack of elements 21, 31 or 41 is held between upper and lower manifolds 91, 92.

Figure 10:
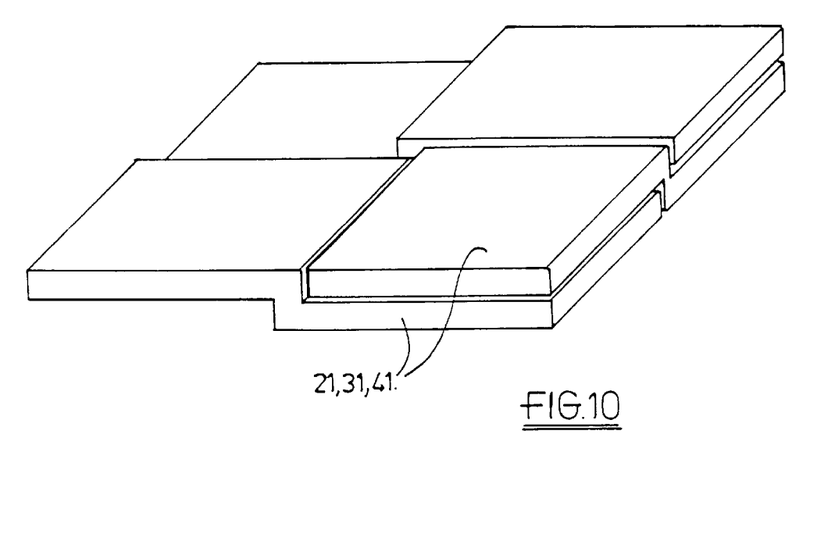
FIG. 10 illustrates two-dimensional stacking.
Figure 11:
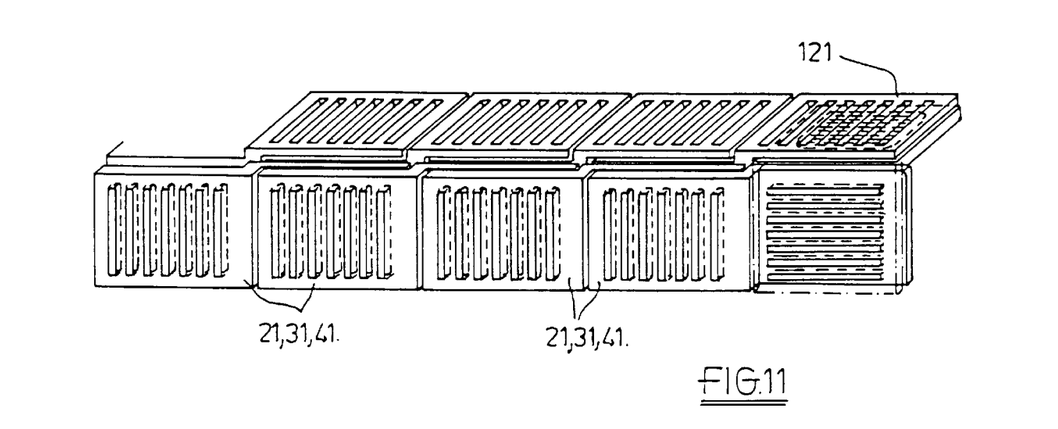
FIG. 11 illustrates three-dimensional stacking using special elevating elements.
Figure 12:
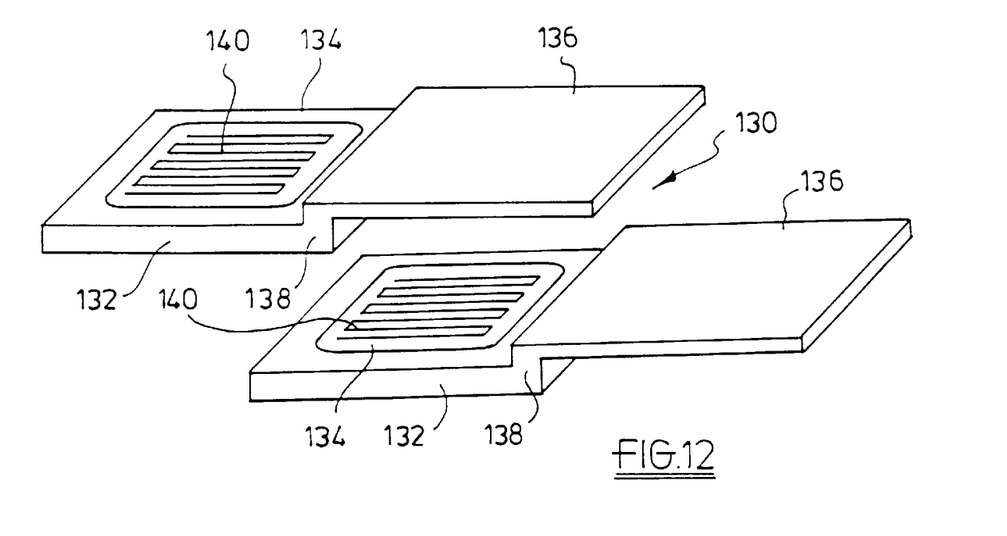
FIG. 12 is a perspective view of adjacent elements of one electrolytic cell embodiment—separated.
Figure 13:
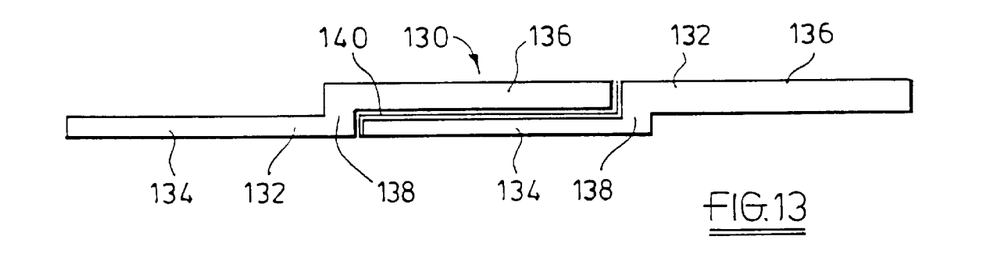
FIG. 13 is a cross-section of the elements of FIG. 12 in stacked configuration.
Figure 14:
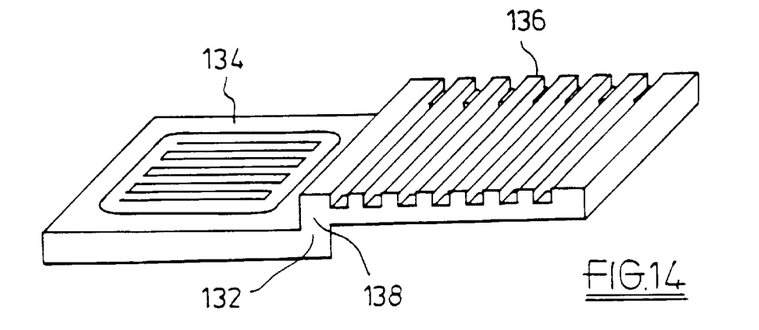
FIG. 14 is a perspective view of an element of a second electrolytic cell embodiment.

FIGS. 6 to 9 illustrate elements stacked in line. FIG. 10 shows how—domino fashion—a comer may be turned so that a second line can be begun. In this way, a two-dimensional stacking can be achieved. FIG. 11 shows how, using special elevating elements 121 a three-dimensional stacking can be realised.

Using the elements described, it is clear that any desired number of fuel cell units can be assembled into substantially any desired configuration necessitating easily designed and manufactured fuel/oxidant supply manifolds and capable of electrical connection to yield any desired voltage/current supply. Connected to fuel/oxidant supplies the arrangements can deliver electrical power as long as those supplies last, and indeed compact power supplies can be designed capable of delivering power for many years without replacement.

If the anode parts of the elements 21, 31, 41 are in part made of or contain hydrogen-releasing material, batteries may be made without the need for attached supplies of fuel gas.

The elements 21, 31, 41 may generally, however, be made by injection moulding, for example, of polymer material. It will in general be desired to make them electrically conductive so as to have an all over constant polarity, and they may be made from a polymer such as polyethylene, poly vinyl chloride or poly tetrafluoroethylene, filled with graphite or carbon black or with a metal plate or gauze insert. The elements may however be made of graphitic or other carbon material.

If a corrosive material is used as a fuel, the elements should clearly be resistant to it. Thus titanium coated for example with a metal oxide or a nickel plated or intrided metal could be used.

FIGS. 12 to 17 illustrate electrolytic cell 130 arrangements comprising a stacking of bipolar elements 132 each element 132 comprising an anode part 134 and a cathode part 136, the anode part 134 of one element cooperating with the cathode part 136 of the next adjacent element.

Figure 15:
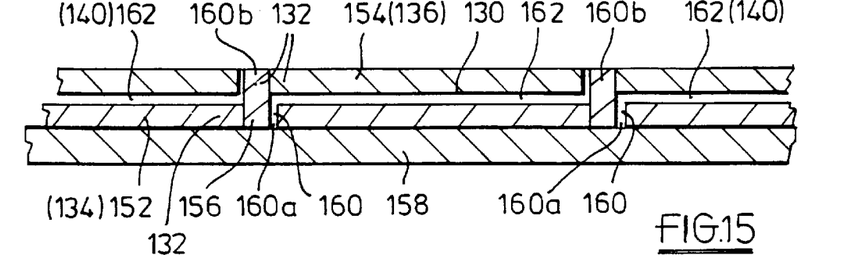
FIG. 15 is a cross-section of a structure assembled by deposition.

Each element 132 comprises an anode plate 134 and a cathode plate 136 joined by a step 138. As illustrated, the elements 132 are monolithic, as by being moulded elements. However, the elements 132 could be assembled (in the widest sense of that word) as shown in FIG. 15 from an anode plate part 152, a cathode plate part 154 and a step part 156 bridging the anode and cathode plate parts. The assembly could be effected, by deposition of layers on a substrate 158, in which a series of anode plates 152 is deposited with gaps 160 between them, then end insulation 160a for said anode plates 152 and, between said end insulation 160a of each plate 152, a conductive bridging fillet 160b. Electrolytic material 162 is then deposited followed by the cathode parts 154.

In any event, the anode part 134 (152) and the cathode part 136 (154) confine between them an electrolytically active material 140 (162).

The cells 130 of the arrangements are conventional dry cells in which the anode and/or cathode and/or electrolyte material is/are consumable, such as zinc-carbon or alkaline batteries. The cells 130 may however be conventional rechargeable cells such as lead-acid cells, nickel-cadmium cells, nickel-metal hydride cells or metal-air cells such as zinc-air, aluminium-air or iron-air cells. In the case of air-breathing cells, the cathode part 136 (FIG. 14) is air breathing, being a perforate, as illustrated, a grating, structure.

Figure 16:
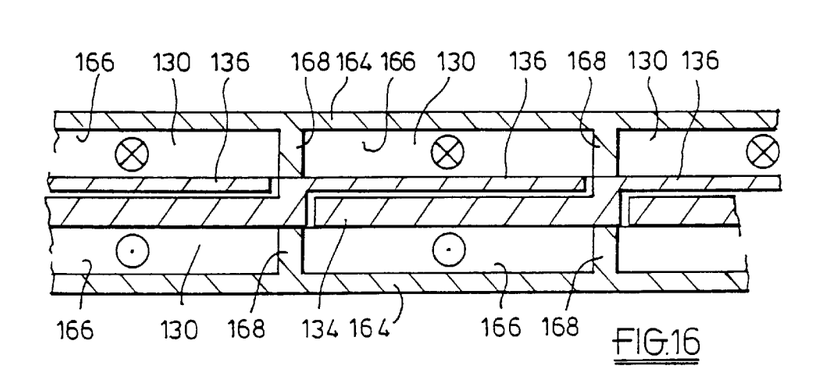
FIG. 16 is a cross-section of a redox flow device assembly.

FIG. 16 illustrates a redox flow device assembly, the cells 130 being in a containment 164 in which the adjacent anode parts 134 of the elements 132 and the adjacent cathode parts 136 are electrically insulated the one from the other. The containment 164 comprises ducting 166 for the electrolyte which flows transversely to the direction of stacking of the elements 132, between insulating walls 168.

The elements 132 are made from an electrolyte-resistant material such as graphitic or other carbon material or a plastics material which includes an electrically conductive filler such as carbon or an electrically conductive insert such as a metal plate or gauze. A metal material could be used such, for example, as titanium, which may be coated with an oxide. Metal elements 132 may be nickel plated or nitrided.

Figure 17:
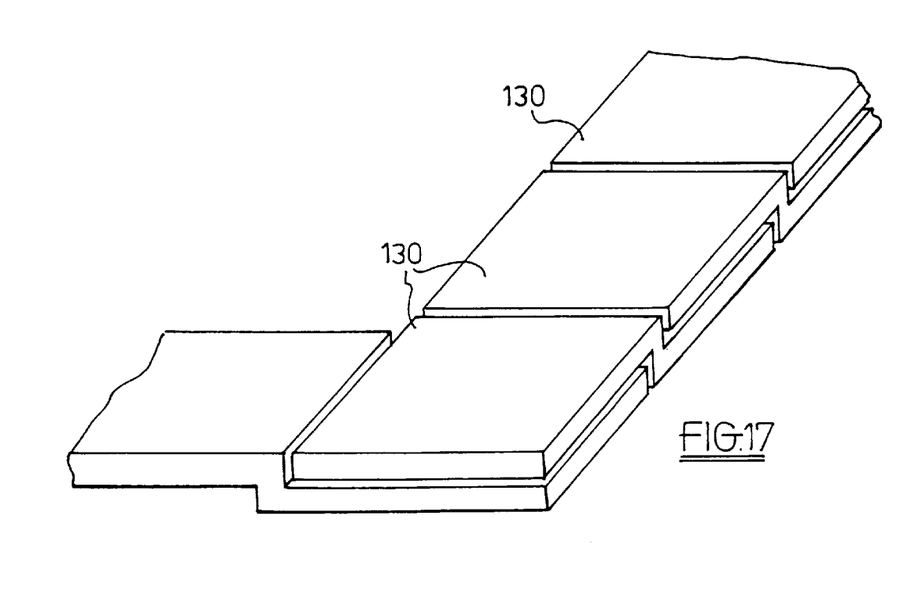
FIG. 17 illustrates an area-covering stacking arrangement.

Redox cell arrangements may include iron/chromium, iron/vanadium, vanadium/vanadium and vanadium/chromium types It will be clear that the architecture of the arrangement can be used for a wide variety of cell types and be fashioned in a wide variety of materials. Although the stacking is primarily a length wise stacking, an area stacking can be effected by turning an end element at right angles to the stacking direction and proceeding in the new direction as shown in FIG. 17.

In identical fashion to the arrangements depicted in FIG. 10 and 11 it is possible to produce 180° turns and—using special elevating elements—stacking out of the tacking plane so that a second and if desired further stacking planes may be used. Cell voltages will be determined by appropriate connections.

FIGS. 18 to 21 show the components of a fuel cell 180 according to the second aspect of the invention. The fuel cells 180 comprise a base strip 182 which itself comprises fuel ducting 184 for the admittance and venting of hydrogen; a membrane electrode assembly 186 having a plurality of anodes (not shown) and cathodes 188 on opposite faces of a fuel cell membrane 190; a plurality of anode current collectors 192 and cathode current collectors 194 in contact respectively with the anodes and cathodes 188. The anode 192 and cathode 194 current collectors are fabricated from thin metal perforated for fuel and reagent access to the membrane, and the base strip 182 is edge-sealingly bonded to the membrane assembly 186.

Figure 20:
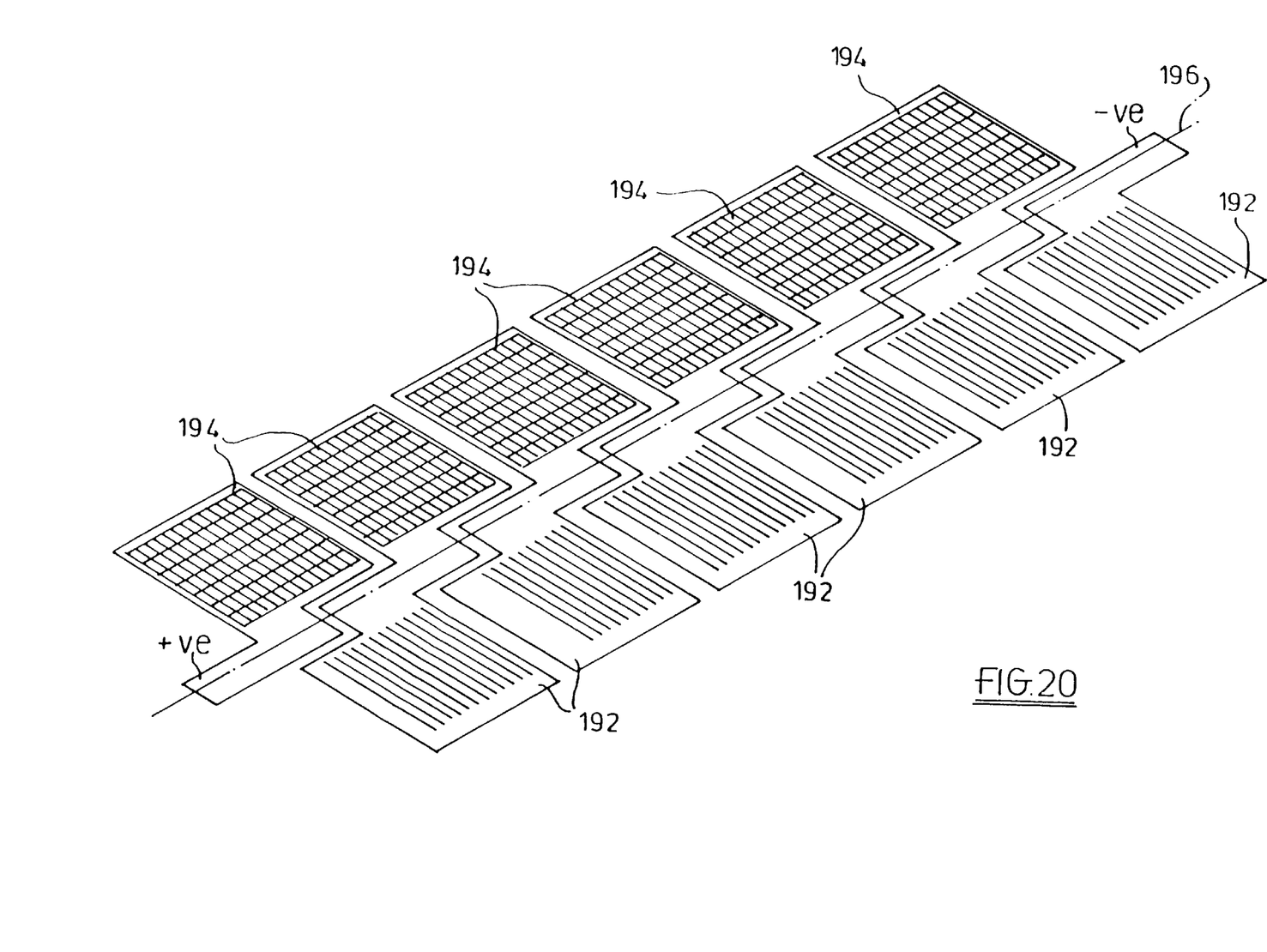
FIG. 20 is a perspective view of anode and cathode current collectors.
Figure 21:
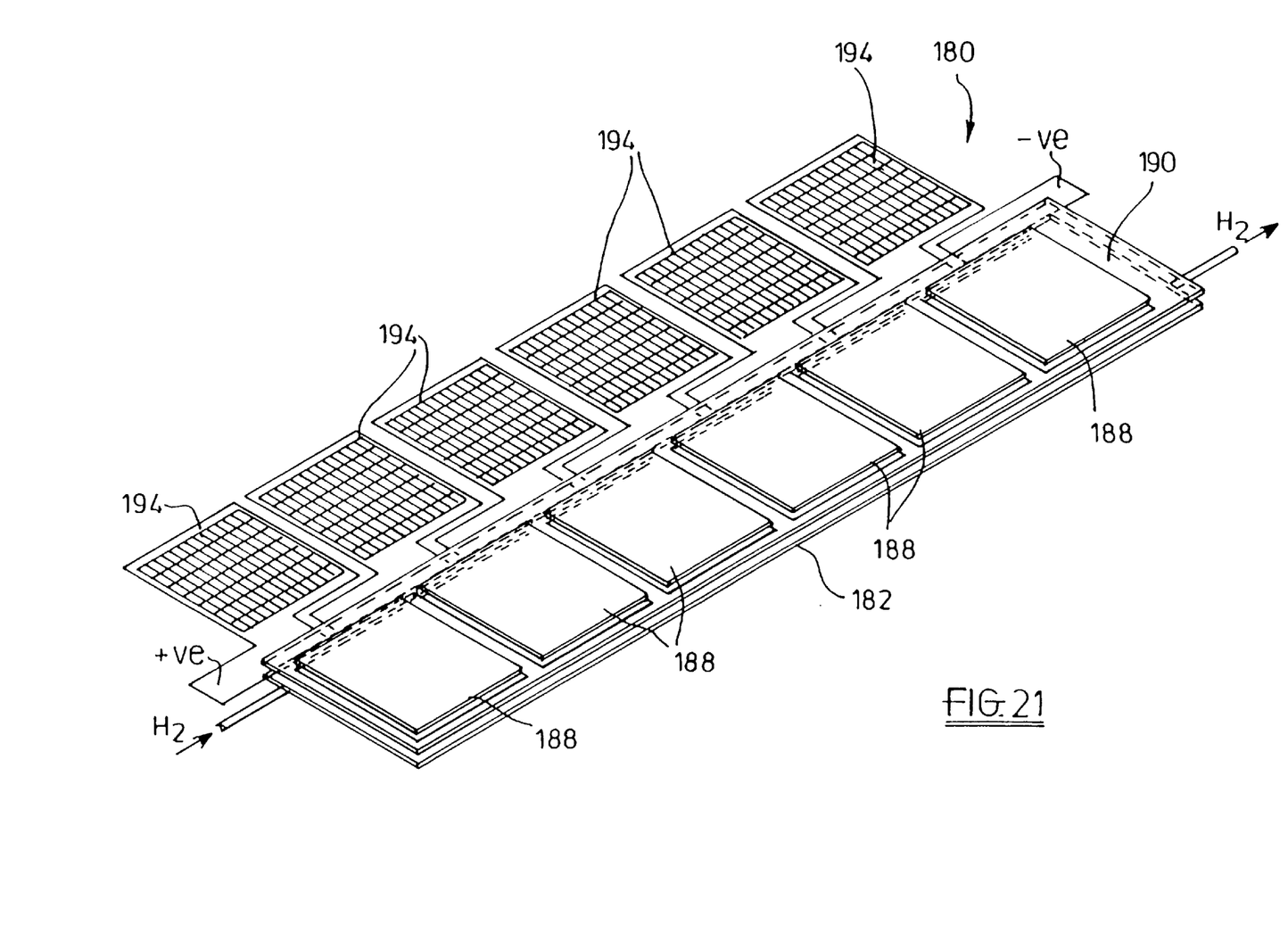
FIG. 21 is a perspective view of a composite fuel cell arrangement.

With the exception of one end anode current collector and one end cathode current collector, pairs of anode 192 and cathode 194 current collectors are integral, the anode current collector for one cell and the cathode current collector for an adjacent cell being fabricated from a single sheet of thin stainless steel and connected on a fold line 196.

Figure 18:
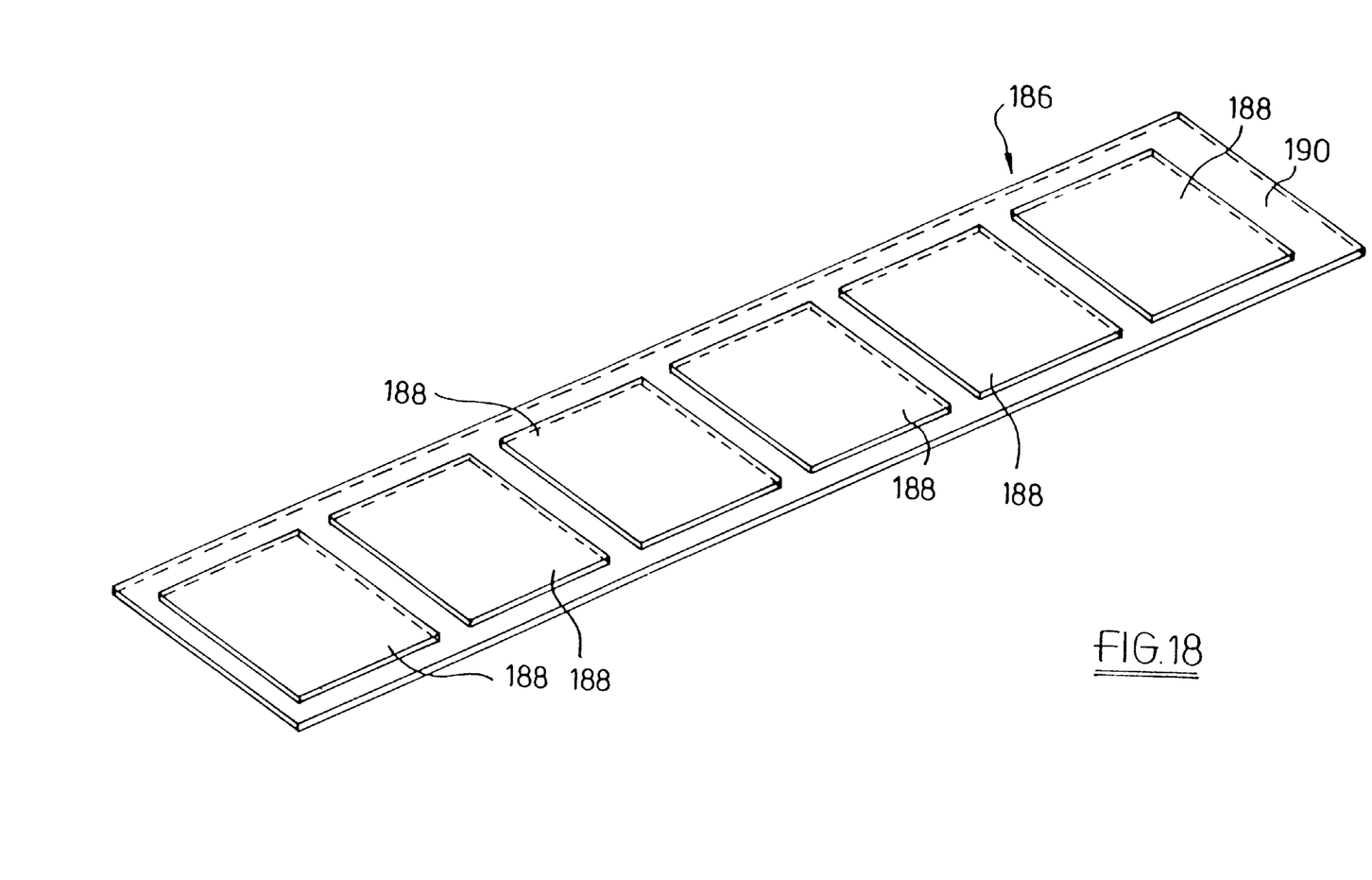
FIG. 18 is a perspective view of a membrane electrode assembly.
Figure 19:
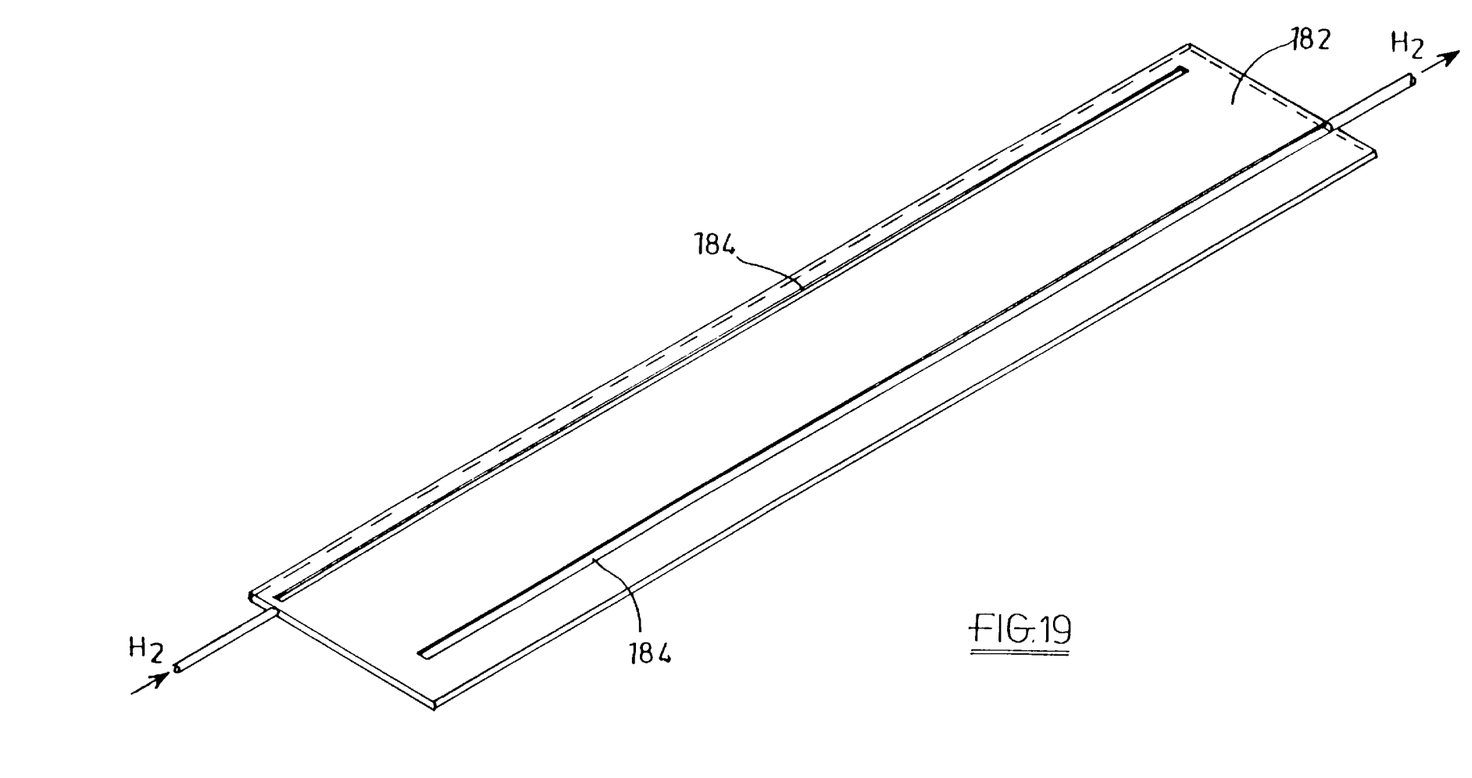
FIG. 19 is a perspective view of a base strip.

The gas access perforations may be produced by etching. The fuel cell 180 is assembled by pressing the membrane electrode assembly 186 on to the anode current collectors 192 and sealed so as to produce a gas tight seal therebetween. The cathode current collectors 194 are then folded over about the fold line 196 so as to press against the cathodes 188.

The resulting fuel cell assembly is very slim—a depth of 3 mm is easily realised—and exhibits a superior power to weight ratio compared to conventional designs. The assembly procedure is simple and the components are relatively inexpensive.

We claim:

1. An arrangement suitable for redox flow cells comprising:
    a stacking of bipolar elements, each element comprising:
        an anode part; and
        a cathode part;
        the anode part of each element cooperating with the cathode part of the next adjacent element; and
    an electrically insulating ion exchange material being confined between the elements.

2. An arrangement according to claim 1, the stacked elements having their adjacent anode parts and their adjacent cathode parts electrically insulated the one from the other.

3. An arrangement according to claim 2, in which the adjacent parts are insulated by ducting for the electrically insulating ion exchange material.

4. An arrangement according to claim 1, in which the elements are stacked in line.

5. An arrangement according to claim 1, in which the elements are stacked in a two dimensional array, the array comprising:
    at least one row of the bipolar elements; and
    at least one column of the bipolar elements.

6. An arrangement according to claim 1, in which the elements are stacked in a three dimensional array using elevating elements, the elevating elements comprising:
    an anode part; and
    a cathode part inclined at a right angle to the anode part.

7. A substantially planar fuel cell comprising:
    a base comprising fuel ducting;
    a membrane electrode assembly having an anode and a cathode on opposite faces of a fuel cell membrane;
    an anode current collector and a cathode current collector in contact respectively with the anode and cathode and being of metal perforated for fuel and reagent access to the membrane; and
    the base being edge-sealingly bonded to the membrane.

8. A fuel cell according to claim 7, in which the collectors are perforated by etching means.

9. A fuel cell according to claim 7, in which the collectors are of stainless steel sheet.

10. A fuel cell according to claim 7, of which the total thickness of the base, membrane, and collectors is between 2 and 5 mm.

11. A fuel cell according to claim 7, further comprising a plurality of membrane electrodes spaced along a base strip and a corresponding plurality of anode and cathode current collectors of which at least one anode and one cathode current collector are integral, connected on a fold line and folded so that the anode current collector is on one face and the cathode current collector is on the opposite face of the membrane electrode.

12. An arrangement suitable for fuel cells comprising a stacking of monolithic bipolar elements, each element comprising an anode part and a cathode part, the anode part of one element cooperating with the cathode part of the next adjacent element.

13. An arrangement according to claim 12, in which each element comprises an anode plate and a cathode plate joined by a step.

14. An arrangement according to claim 12, in which the elements are molded elements.

15. An arrangement according to claim 12, in which the elements are assembled from an anode plate part, a cathode plate part and a step part bridging the anode and cathode plate parts.

16. An arrangement according to claim 12, in which the arrangement is effected by deposition of layers on a substrate.

17. An arrangement according to claim 12, in which the anode part and cathode part confine between them an electrically insulating ion exchange material.

18. An arrangement according to claim 12, in which the cathode part is air-breathing as by a perforate.

19. An arrangement according to claim 17, in which the elements are redox flow cells.

20. An arrangement according to claim 19, the elements having their adjacent anode parts and their adjacent cathode parts electrically insulated the one from the other.

21. An arrangement according to claim 20, in which the adjacent parts are insulated by ducting for the electrically insulating ion exchange material.

22. An arrangement according to claim 12, in which the elements are from of an electrolyte-resistant material.

23. An arrangement according to claim 22, in which the elements are formed of a graphitic material.

24. An arrangement according to claim 22, in which the elements are formed of a non-graphitic carbon material.

25. An arrangement according to claim 22, in which the elements are formed of a plastics material.

26. An arrangement according to claim 25, in which the plastics material includes an electrically conductive filler.

27. An arrangement according to claim 25, in which the plastics material includes an electrically conductive insert.

28. An arrangement according to claim 22, in which the elements are formed of a metal material.

29. An arrangement according to claim 28, in which the metal material is an oxide-coated titanium foil or plate.

30. An arrangement according to claim 28, in which the metal material is nickel-plated.

31. An arrangement according to claim 29, in which the metal material is nitrided.

32. An arrangement according to claim 12, in which the elements have working fluid supply and exhaust ducting.

33. An arrangement according to claim 32, in which the anode part and the cathode part of each element have working fluid supply and exhaust ducting.

34. An arrangement according to claim 32, in which the anode part of each element has working fluid supply and exhaust ducting and the cathode part has an ambient air access arrangement.

35. An arrangement according to claim 34, in which said cathode part has a grating structure.

36. A fuel cell arrangement according to claim 12, in which a proton conducting or ion exchange membrane is held between the anode part of one element and the cooperating cathode part of the next adjacent element.

37. An arrangement according to claim 36, in which the elements are stacked in or on a holder comprising a working fluid supply and exhaust manifold arrangement.

38. An arrangement according to claim 12, in which the elements are formed at least partially from a conductive material.

39. An arrangement according to claim 38, in which the elements are made of graphitic material.

40. An arrangement according to claim 38, in which the elements are made of non-graphitic carbon material.

41. An arrangement according to claim 38, in which the elements are formed of a polymeric material.

42. An arrangement according to claim 41, in which the polymeric material includes graphite or carbon black.

43. An arrangement according to claim 12, in which the elements include a metallic plate or gauze.

44. An arrangement according to claim 12, in which the elements are stacked in line.

45. An arrangement according to claim 12, in which the elements are stacked in a two dimensional array, the array comprising:
at least one row of the bipolar elements; and
at least one column of the bipolar elements.

46. An arrangement according to claim 12, in which the elements are stacked in a three dimensional array using elevating elements, the elevating elements comprising:
an anode part; and
a cathode part inclined at a right angle to the anode part.

47. An arrangement according to claim 1, in which the elements are made from an electrolyte-resistant material.

48. An arrangement according to claim 47, in which the elements are formed of a graphitic material.

49. An arrangement according to claim 47, in which the elements are formed of a non-graphitic carbon material.

50. An arrangement according to claim 47, in which the elements are formed of a plastics material.

51. An arrangement according to claim 50, in which the plastics material includes an electrically conductive filler.

52. An arrangement according to claim 50, in which the plastics material includes an electrically conductive insert.

53. An arrangement according to claim 47, in which the elements are formed of a metal material.

54. An arrangement according to claim 53, in which the metal material is an oxide-coated titanium foil or plate.

55. An arrangement according to claim 53, in which the metal material is nickel-plated.

56. An arrangement according to claim 54, in which the metal material is nitrided.

* * * * *